J. B. WIARD.
DYNAMO ELECTRIC MACHINE.
APPLICATION FILED MAY 15, 1914.

1,157,970.

Patented Oct. 26, 1915.

WITNESSES:
J. Ellis Glen.
Anthony Maus.

INVENTOR:
JOHN B. WIARD,
BY Albert G. Davis
HIS ATTORNEY.

UNITED STATES PATENT OFFICE.

JOHN B. WIARD, OF LYNN, MASSACHUSETTS, ASSIGNOR TO GENERAL ELECTRIC COMPANY, A CORPORATION OF NEW YORK.

DYNAMO-ELECTRIC MACHINE.

1,157,970.  Specification of Letters Patent.  Patented Oct. 26, 1915.

Application filed May 15, 1914. Serial No. 838,692.

*To all whom it may concern:*

Be it known that I, JOHN B. WIARD, a citizen of the United States, residing at Lynn, in the county of Essex, State of Massachusetts, have invented certain new and useful Improvements in Dynamo-Electric Machines, of which the following is a specification.

My invention relates to dynamo electric machines and particularly to centrifugally operated switches for controlling circuits of such machines.

It has for its object a novel and simple construction of centrifugal switch, the contact members of which are arranged to make a wiping contact.

The various features of novelty which characterize my invention are pointed out with particularity in the claims annexed to and forming a part of this specification.

For a better understanding of my invention reference may be had to the following description taken in connection with the accompanying drawing, in which—

Figure 1:
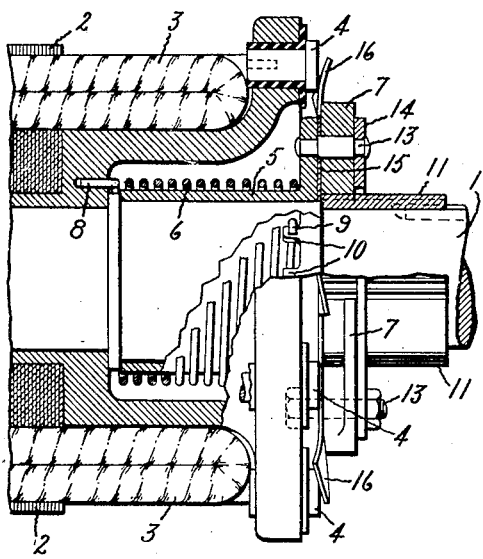
Figure 2:
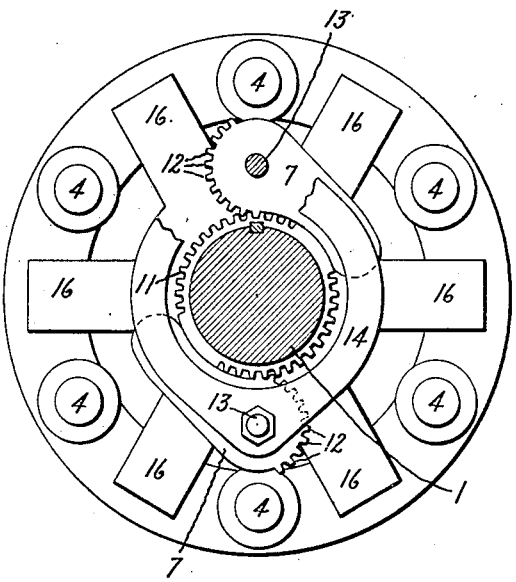

Figure 1 is a view, partly in section, of a rotatable member of a dynamo electric machine embodying my invention; Fig. 2 is an end view of the member of the dynamo electric machine shown in Fig. 1, and Fig. 3 is a diagram of connections.

Referring to the drawing, 1 is a shaft on which is mounted a rotatable member of a dynamo electric machine, which member comprises a core 2 in slots in the periphery of which is mounted a winding 3. Taps on this winding are brought out to contact members 4, which may be connected together by means of my centrifugal switch. This switch comprises a member 5 which surrounds the shaft 1, and is rotatable relative thereto, a spring 6 which opposes the movement of the member 5 around the shaft, and one or more pivoted, centrifugally operated members 7 mounted on the member 5 and tending to turn the same around the shaft. Preferably, one end 8 of the spring 6 is fastened to the core 2 of the rotatable member of the dynamo electric machine and the other end 9 of this spring is fastened to the member 5. If desired, a series of projections 10 may be provided on the member 5 so that the tension of the spring 6 may be adjusted by moving the end 9 of the spring so as to engage different projections.

In order to rotate the member 5 relatively to the shaft, a gear 11 is keyed to the shaft and the inner ends of the centrifugal members are provided with teeth 12, these teeth meshing with the teeth on the gear 11. The centrifugal members are pivotally mounted on the studs 13, these studs in turn being mounted between a supporting plate 14 and the member 5. In the arrangement shown, the member 5 has fastened thereto, a plate 15 having arms 16 which act as contact members for engaging the studs 4.

Figure 3:
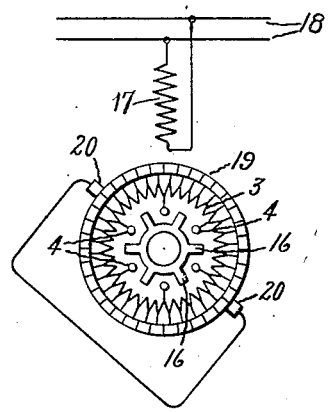

My invention may be used for controlling the circuit of any type of dynamo electric machine, and in the diagram of Fig. 3, I have shown it applied to a motor which starts as a repulsion motor and runs as an induction motor. This motor has a field winding 17, which is connected to alternating current mains 18, and an armature winding 3 connected to a commutator 19 and to the contact members 4. Bearing on the commutator 19 are brushes 20 which are short-circuited on each other. The commutator is usually mounted at one end of the rotatable member of the dynamo electric machine and the contact members are mounted at the other end. Since only a portion of the rotatable member of the machine is shown in Fig. 1, the commutator is not shown in this figure. When the machine is starting, the parts are as shown in the drawing, the centrifugal members 7 being in their folded-in position, (see Fig. 2), and the contact arms 16 are out of engagement with the contact members 4, the spring 6 tending to hold the contact arms in this position. The motor therefore, starts as a simple repulsion motor and operates as such until it reaches about three-fourths of its normal speed, whereupon the centrifugal members fly outwardly against the tension of the spring 6 and rotate relatively to the shaft because of the engagement of the teeth 12 of the centrifugal members with the teeth on the gear wheel 11. The rotation of the centrifugal members carries with them the member 5 until the contact arms 16 engage the contact members 4, whereupon the points of the winding 3 to which the contact members 4 are connected are directly short-circuited and the motor operates as an induction motor. It will be noted that the ends of the contact arms are slightly bent so that they will easily ride upon the contact members 4. When the field of the motor is disconnected from the line and the rotatable member comes to rest, the spring 6 rotates the member 5 and the centrifugal members to the position shown in the drawing.

Furthermore, although I have illustrated my invention in connection with a particular type of alternating current motor, I desire it to be understood that it is not limited in its use to such a motor, but may be used in numerous types of dynamo electric machines, and I aim in the appended claims to cover all such modifications as well as any others which do not depart from the spirit and scope of my invention.

What I claim as new and desire to secure by Letters Patent of the United States, is:—

1. In combination, a shaft, a rotatable member of a dynamo electric machine mounted on said shaft, and a centrifugally operated switch controlling a circuit of said machine comprising a member surrounding said shaft and rotatable relative thereto, a spring opposing the movement of said member around the shaft, a gear mounted on said shaft, and centrifugally operated members pivotally mounted on said member surrounding the shaft, said centrifugally operated members having teeth meshing with the teeth of said gear and tending to turn said member around the shaft.

2. In combination, a shaft, a rotatable member of a dynamo electric machine mounted on said shaft, and a centrifugally operated switch controlling a circuit of said machine comprising a member surrounding said shaft and rotatable relative thereto, a spring opposing the movement of said member around the shaft, said spring having one end fastened to the rotatable member of the dynamo electric machine and the other end fastened to the member surrounding the shaft, a gear mounted on said shaft, and centrifugally operated members pivoted on said member surrounding the shaft, said centrifugally operated members having teeth meshing with the teeth on said gear and tending to turn said member around the shaft.

In witness whereof, I have hereunto set my hand this 12th day of May 1914.

JOHN B. WIARD.

Witnesses:
JOHN A. McMANUS, Jr.,
ARTHUR M. STANLEY.

Copies of this patent may be obtained for five cents each, by addressing the "Commissioner of Patents, Washington, D. C."